United States Patent [19]
Livolsi et al.

[11] Patent Number: 6,138,746
[45] Date of Patent: Oct. 31, 2000

[54] COOLING COIL FOR A THERMAL STORAGE TOWER

[75] Inventors: Peter P. Livolsi, Perry Hall; John M. McCullough, Catonsville; Glenn W. Smith, Mt. Airy, all of Md.

[73] Assignee: Baltimore Aircoil Company, Inc., Jessup, Md.

[21] Appl. No.: 09/256,522

[22] Filed: Feb. 24, 1999

[51] Int. Cl.[7] .................................................. F28F 9/22
[52] U.S. Cl. ...................... 165/145; 165/163; 165/900; 165/910
[58] Field of Search .................. 165/145, 163, 165/10, 910, 901, 902, 900

[56] References Cited

U.S. PATENT DOCUMENTS

| | | | |
|---|---|---|---|
| 1,486,482 | 3/1924 | Cowles | 165/145 |
| 1,770,375 | 7/1930 | Brandt | 165/145 |
| 2,662,850 | 12/1953 | Kraft | 165/145 |
| 4,063,589 | 12/1977 | Battcock | 165/163 X |
| 4,142,579 | 3/1979 | Kazanvich et al. | 165/900 X |
| 4,196,157 | 4/1980 | Schinner | 261/155 |
| 4,593,755 | 6/1986 | Rogers, Jr. | 165/145 |
| 4,683,101 | 7/1987 | Cates | 261/146 |
| 4,737,321 | 4/1988 | McCloskey et al. | 261/109 |
| 4,831,831 | 5/1989 | Carter et al. | 62/59 |
| 4,951,739 | 8/1990 | Cates et al. | 165/10 |
| 5,452,758 | 9/1995 | Manterer | 165/145 |

FOREIGN PATENT DOCUMENTS

| | | | |
|---|---|---|---|
| 1295818 | 5/1962 | France | 165/900 |

OTHER PUBLICATIONS

Brochure from Baltimore Aircoil Company, Number S–5M–8/90, Bulletin S140/1–0E, "Ice Chiller Thermal Storage Units —For Thermal Storage Systems", p. 7.

"Ice Chiller Thermal Storage Unit" Application Guide Catalog Number S156/1–0AA to Baltimore Aircoil Company, 1995.

"Ice Storage" Bulletin S143/1–0CA to Baltimore Aircoil Company, 1985.

"Ice Chiller Chiller Rigging Instructions" R160/1–0 to Baltimore Aircoil Company, 1990.

"Northwind" to Northwind Incorporated, 1993.

Primary Examiner—Christopher Atkinson
Attorney, Agent, or Firm—Edward J. Brosius; F. S. Gregorczyk; Stephen J. Manich

[57] ABSTRACT

A cooling coil arrangement for a cylindrical tower provides coverage of a larger area of the cylindrical footprint of a cooling tower to enable more economical usage of the vertical tower storage capacity for ice thermal storage, which coil arrangement has a plurality of coils arranged in multiply arranged planes with serpentine layouts of each tubing length generally having a vee-shaped layout in each plane between the longitudinal axis of the tower and the tower housing, which tubing lengths are provided in each sector of each plane normal to the axis and having a tubing length therein, and the manifolds coupling the tubing lengths to inlet and outlet ports for circulating coolant fluid through the tubing lengths to cool the phase change fluid in the cooling tower, and a plurality of the serpentine tubing lengths vertically aligned and preferably arranged with the tubing section of one u-shaped segment of a first tubing length in vertical alignment with the gap of another of the tubing lengths which provides more uniform distribution of the cooling capacity of the cooling fluid and consequently a more uniform development of any crystalline formation of the phase-change fluid on or about each tubing length.

13 Claims, 6 Drawing Sheets

COOLING COIL FOR A THERMAL STORAGE TOWER

BACKGROUND OF THE INVENTION

1. Field of the Invention

The present invention relates to fluid storage towers for a cooling system. More specifically, the invention provides a pipe-coil arrangement for a cylindrical ice-thermal storage tower facility with a phase-change fluid, which storage facility is usually vertically arranged on a relatively compressed land parcel. The pipe-coil arrangement is configured to fill a geometric sector of a tower, which sector is a portion of a circular cross-section in a plan view. Use of a plurality of such pipe-coil arrangements for several such tower sectors cooperate to fill a planar cross-section, usually a circle, of a tower. A plurality of individual coils of the present invention may be vertically arranged in stacks and used in lieu of present rectangular or oblong storage coil configurations. The stacked coils will more completely or more efficiently fill the available tower volume than the rectangular coils, thereby more completely using the available internal storage volume of a cylindrical tower. The phase-change fluid in the tower volume, generally water, may be solidified into a thermal storage mass by the coolant fluid transferred through the pipe coils.

The solidification process is associated with a change in temperature and volume of the storage phase-change fluid, that is expansion and contraction between the liquidus and solidus states and, related structural expansion-contraction and operational problems of the tower. The shaped pipe-coil arrangements noted above are generally triangular or wedge-shaped in a plan view. Utilization of several of the wedge-shaped sections collectively operate to occupy and thus more completely utilize the cross-sectional area of the cylindrical tower. Consequently the available tower volume is more completely filled, which provides a more efficient use of the available thermal storage capacity of an ice-thermal storage tower structure.

2. Prior Art

Cooling towers are frequently utilized in cooling and air conditioning apparatus. These tower apparatus may include condensers, evaporators or water towers. Further, tall vertical towers with circular cross-sections are known and used in the water or liquid storage industry. However, tower structures are not generally used in an ice-thermal storage apparatus, or rather, the height of the structure has been limited to a relatively low height. In particular, it is known that ice-thermal storage towers have been, or are usually, constructed with a maximum height or vertical limitation of six heat exchange coil sections, or stacks, in height, which limit may be considered to be approximately forty feet in vertical elevation. The historic background to this limitation is not specifically known, however, the land mass available for ice thermal storage units has induced their assembly in a laterally expansive or horizontal direction rather than as a vertical structure. Thus, the generally available ice-thermal storage units, their structure and capacity have been, or are known to be, limited to a collection of heat exchange thermal storage coils only six units, or stacks, in height. The assembled plurality of heat exchange coil units is often serially arranged in a horizontal manner, which units are usually factory-assembled coil modules. This historical assemblage of thermal-storage units allowed ease of construction and maintenance, but did not maximize the vertical usage of available land mass.

A known ice thermal storage structure, which is approximately twenty-five feet high, has a diameter less than twelve feet. In this known structure, the cooling coil segments of the tower are annuli with a height of approximately four feet. These coil annuli are manufactured in an assembly plant and thereafter site-assembled. However, the noted dimensional limitations are shipping constraints imposed by freight transport capacities and capabilities. Therefore, the tower structure is limited both in height and diameter.

Ice-thermal storage units are utilized in a variety of applications, such as commercial office buildings, schools and hospitals. Ice thermal storage technology has evolved as a comparatively economical, energy conserving means to store cooling capacity, which cooling capacity is developed and stored during a time period when energy costs are more economic. As an example, ice is developed or generated during the night when both electric rates and consumer demand are lower than during the day. The cooling capacity of the stored ice is usually utilized during higher demand and higher electric rate periods to provide cooling for commercial facilities, such as office buildings, schools, hospitals and banks.

The operational mode of an ice-thermal storage unit is dependent upon the type of equipment and its application. The ice-thermal storage units usually provide a phase-change fluid, such as water, in a storage housing with a plurality of heat exchange coils or coil sections immersed in the phase-change fluid. The heat exchange coils are coupled to a refrigerant circuit for communication of a refrigerant coolant fluid through the coils. The refrigerant fluid cools the phase-change fluid and develops ice on the heat exchange coils in the storage housing during the cooling cycle. This ice develops around the heat exchange coils until essentially all the phase-change fluid in the tank is either a crystalline solid, that is ice, or is at, or about, the fluid freezing point. Thereafter, the ice mass is retained until a demand or load is applied to the ice mass, such as by coursing warm phase-change fluid over the heat exchange coils and the ice in the tower. Alternatively, a warm coolant fluid could be transferred through the coils for reducing its temperature. The warm fluid is reduced in temperature and may be transferred to a warm load, such as a heat exchanger, evaporator, condenser, subcooler, or another application requiring a reduced temperature refrigerant or working fluid. This temperature reduction of the warm phase-change fluid melts at least some of the ice mass and, depending upon the demand or load, will eventually elevate the temperature of the stored phase-change fluid in the tower above the melting-freezing temperature. Alternatively, it is possible to utilize the chilled fluid in the tank to cool an ancillary operating unit. The cooling or freezing cycle is then iterated to again generate frozen fluid for harvesting of the stored cooling capacity at a later time.

An exemplary and known large mass ice-cooling thermal storage system is located in a metropolitan area and is operable to provide chilled water for numerous buildings in a commercial district. This system includes a plurality of serially arranged, large ice thermal storage units in a central location, which units are individual, free-standing units on separate levels or building floors. The collection of units has a facade structure around its skeleton to mask the operating equipment. However, this assembly or system is not a single, multistory tower for retention of all the phase-change fluid, and it does not have a plurality of heat exchange coil segments retained within a single tower. The particularly noted, centrally located chilled water system is operable and adaptable to a downtown metropolitan environment because of the relatively close proximity of a large number of users of chilled water.

Single large-volume ice thermal storage units are known but they are generally low-profile or low-height, horizontally arranged assemblies of multiple ice-thermal-storage units distributed over a broad area, that is only up to six heat exchange segments in height, but either very wide or very long. These are not vertically projecting structures on a relatively small surface area footprint. An exemplary thermal storage unit is illustrated in U.S. Pat. No. 4,831,831 to Carter et al. The necessary piping, manifolds, couplings and valves for arranging a plurality of either vertical or horizontal units are not shown therein, but these elements are known in the art.

An ice-thermal storage unit may have a fixed latent storage capacity in terms of cooling ton-hours, as well as specified coolant fluid flow rates and prescribed inlet and outlet temperatures. The storage unit, which may have specific dimensions and an operating mass or weight, can include a tank, a coil, insulation, exterior panels, a cover or covers, an air pump and an air distributor.

There are a number of operating modes associated with the use of thermal storage units, which modes may typically include the following: (1) ice build-up; (2) ice build-up with cooling of the coupled cooling load; (3) cooling utilizing; the ice only; (4) cooling with a chiller only; and, (5) combined cooling with both a chiller and the ice. The present invention is available to provide all of the noted operations; to be coupled to a plurality of users or cooling loads remote from the situs; and, to occupy a minimal land mass while providing a large capacity ice thermal storage facility.

SUMMARY OF THE INVENTION

A vertically oriented ice-cooling system has an ice-thermal storage tower to provide the economies of ice-thermal storage systems for large commercial facilities on a disproportionately confined lateral area. The ice-thermal storage tower has a plurality of heat exchange coil segments, which are arranged and secured in the tower as a network for retention in a layered vertical array. The three-dimensional perspective of the arrangement is comparable to a plurality of serpentine tubular sections with each tubular section in a plane and flaring outwardly from a vertex, such as the tower longitudinal axis, in a plan view. The plurality of tube sections in planes are vertically stacked to provide a section of parallel planes. The individual stack may be characterized as wedge shaped or about triangular in plan view, and having a vertical height. The tubular elements within the stacks are vertically nested upon each other, but the adjacent rows of tubing are offset from direct alignment of vertically adjacent tube sections, which provides a staggered effect in the array. A stack is generally defined as a block or wedge of the tube sections with the above-noted triangular or vee-shaped plan view and a defined or predetermined height. Each end of a tubular coil segment is coupled to a manifold in proximity to either the longitudinal axis of the tower or the tower outer wall. The vertically arranged coil stacks allow freedom for limited movement in response to their expansion and contraction within the tower. This structure also allows for isolation, maintenance and repair of the interconnected coil segments without disengagement of the heat-exchange operation or apparatus.

The physical constraints associated with vertical ice-thermal storage towers, which generally limit the assembly of multiple heat exchange coil segments beyond presently utilized limitations of six segments in vertical orientation, have been accommodated in an earlier system. These prior art constraints include the readily apparent increased vertical mass load and the fluid pressure from the column height. The tower structure retains the phase-change fluid and the heat exchange coil segments. However, the operational parameters of the thermal storage system along with the internal effects inherent in the operating system must accommodate the following: fluid to solid expansion-contraction changes; fluid flow; shifting ice mass; fluid transport of both the phase-change fluid and a refrigerant fluid; and, provision for uninterrupted operation even during maintenance. As in most thermal storage structures, the majority of the mechanical operating elements are outside of the tower structure, that is pumps, compressors and receivers.

The present invention effectively isolates each heat exchange coil segment within the above-noted stacked array with a retention apparatus arrangement, which permits limited vertical and horizontal movement of each coil segment while still confining the individual coil stack to its isolated position in the array. The fluid flow of the liquidus phase-change material is unconstrained, but crystalline particulate movement between stacks is inhibited to avoid channelling and packing, which would inhibit smooth heat transfer between the frozen crystalline material on the coil segments and the liquidus moving past the coil segments. In addition, this array arrangement provides utilization of an increased percentage of the tower cross-sectional area by each tube, and consequently, an increased percentage of the tower volume. This increase in the use of the available tower volume without increasing the tower height or diameter provides an increase in the efficiency of the tower and, thus, a more efficient use of the available land area. The increased efficiency may be gleaned from increasing the cooling coil area for the same sized tower; providing a smaller tower for a specific cooling capacity because of the increased cooling coil area; or from having to operate the mechanical cooling equipment for less time to achieve the same cooling capacity. The specific measure of improved efficiency is left to the individual circumstance and situation.

BRIEF DESCRIPTION OF THE DRAWING

In the several Figures of the Drawing, like reference numerals identify like components, and in the drawing.

DETAILED DESCRIPTION OF THE PREFERRED EMBODIMENT

Figures 1, 2, 3:
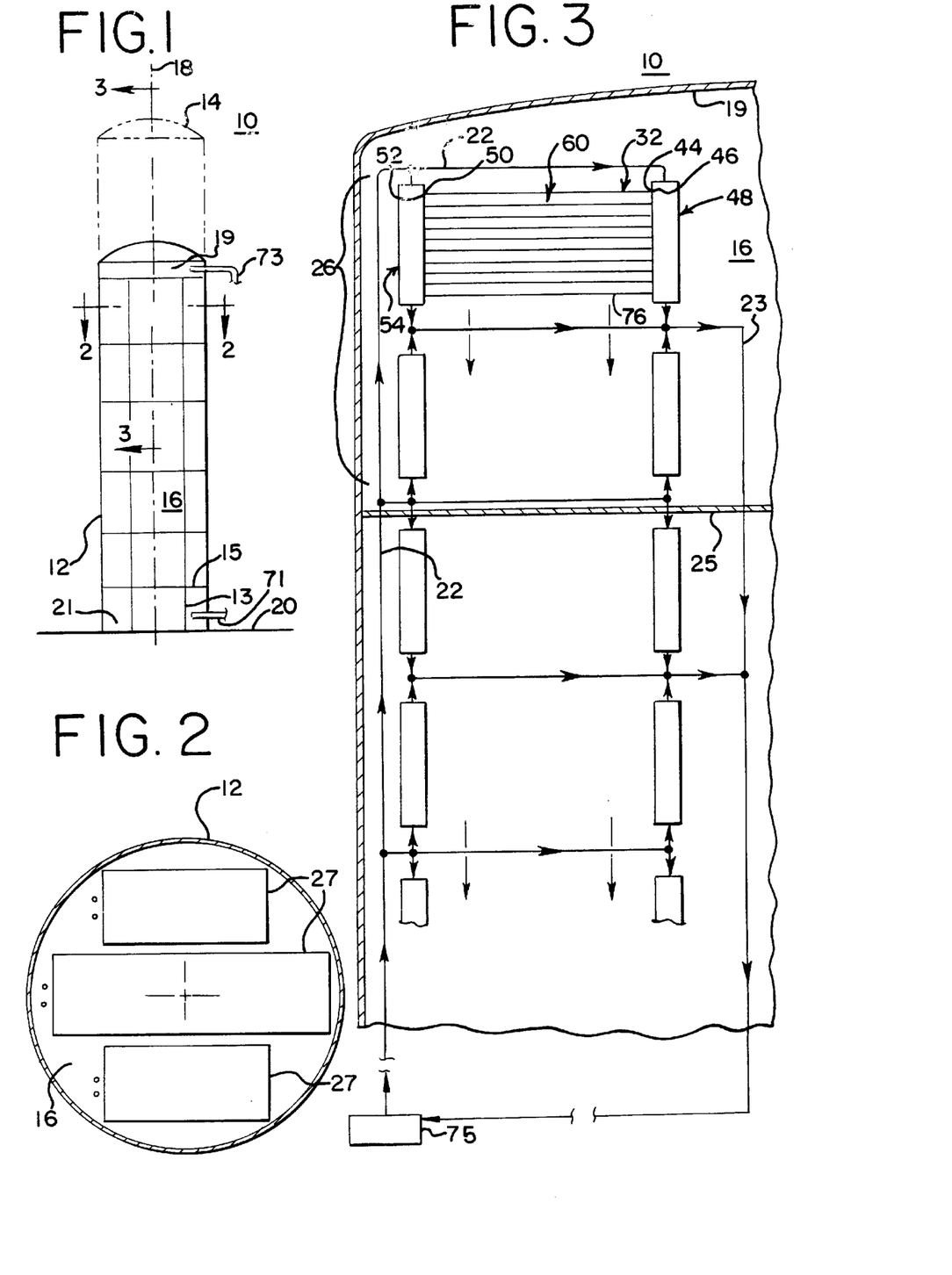
FIG. 1 is a diagrammatic elevational view in cross-section of a tower and base.
FIG. 2 is a plan view of the tower in FIG. 1 taken along the line 2—2 with the general outline of prior art cooling coil arrangements.
FIG. 3 is an enlarged partial elevational view of the tower in FIG. 1 taken along the line 3—3 noting the cooling coil stacks.
Figure 4:
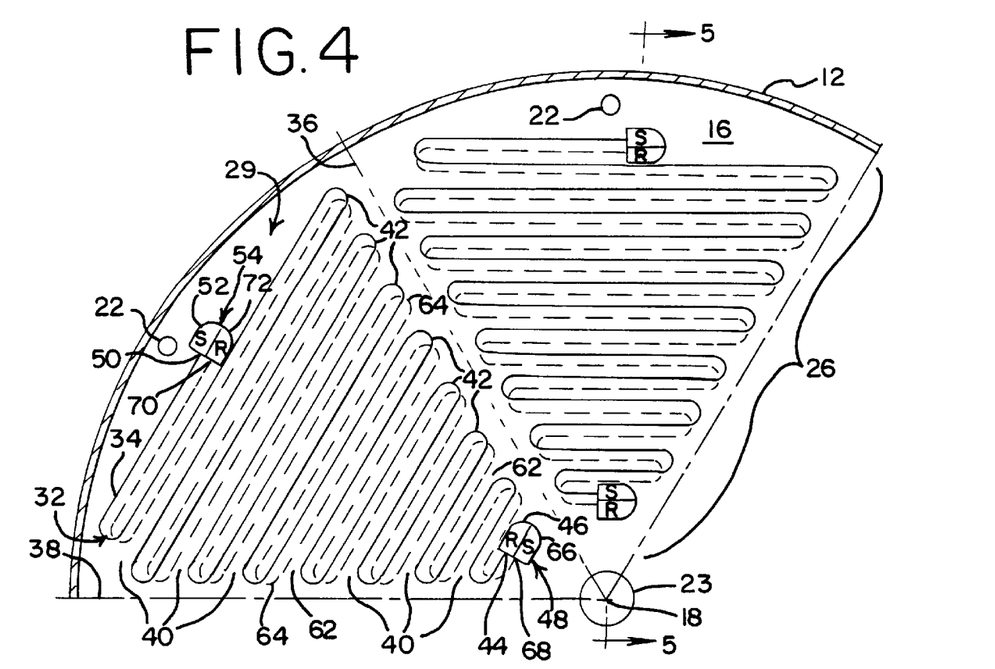
FIG. 4 is a schematic plan view of a parallel circuit coil of a coil stack with a 60° coil layout sector.

Exemplary tower assembly 10 in FIG. 1 has tower housing 12 with roof 14 and chamber 16, which housing 12 is shown as a cylindrical form with domed roof 14 and longitudinal axis 18. Tower assembly 10 is mounted on concrete foundation 20, which foundation 20 generally defines a footprint for tower 10 on a relatively constrained parcel of real estate when compared to the proferred tower volume. In FIG. 4, supply conduit 22 is in proximity to housing 12 with coolant return conduit 23 centrally located and generally coaxial with longitudinal axis 18. Although the plan view of tower housing 12 has a circular outline, the circular outline is, or may be, divided into multiple wedge-shaped sectors, such as sector 29 bounded by radii 36 and 38, and housing 12. Each sector 29 has a plurality of stacked cooling coils 26 in the sector, as noted in FIG. 3. However, as the requirements for each sector 29 and cooling coil stack 26 are generally the same only one cooling coil stack 26 in a sector 29 of tower 12 will be described, but the description will apply to the several tower sectors 29 and cooling coil stacks 26.

Figure 1A:
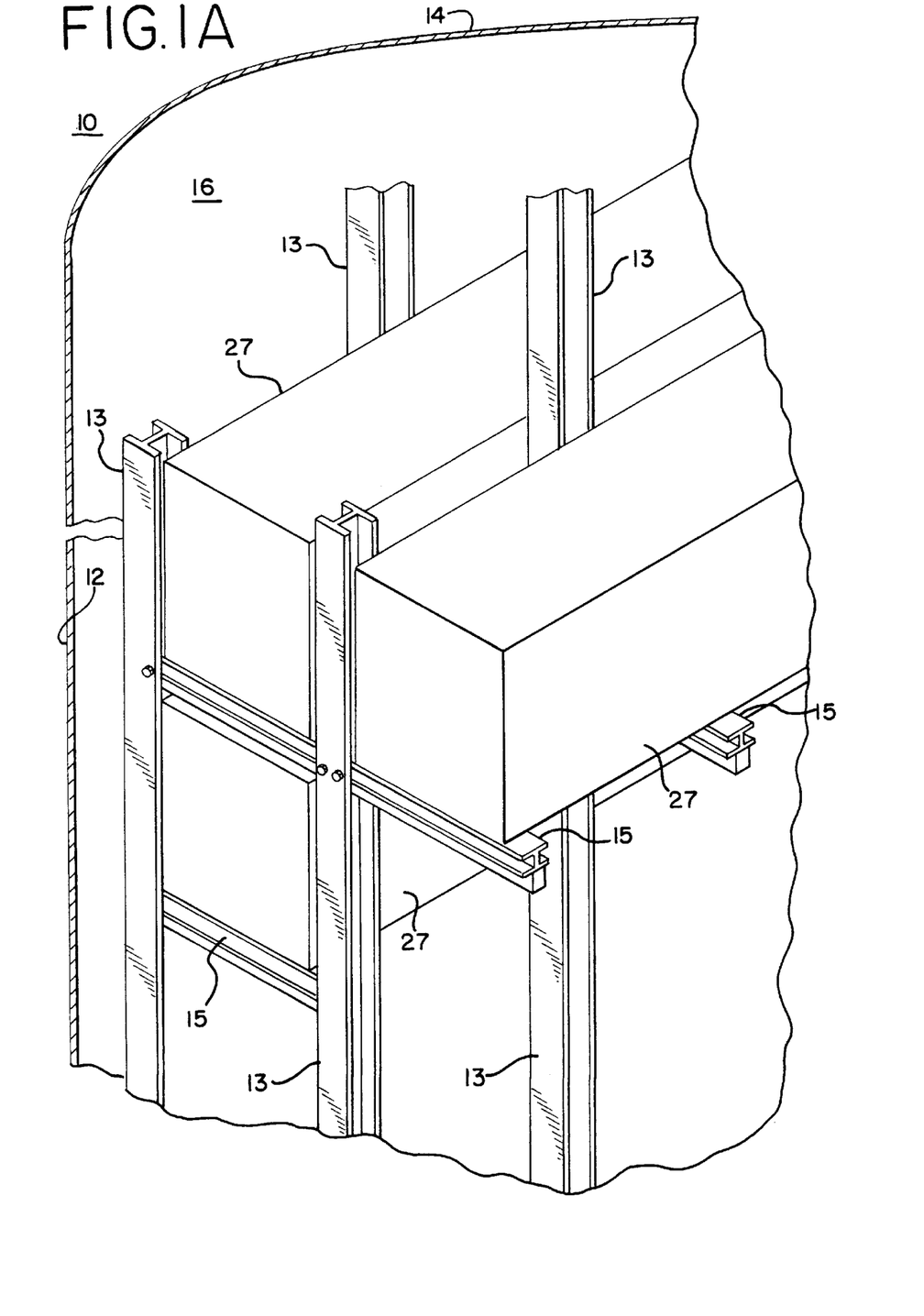
FIG. 1A is a partial oblique view of a internal grid support network of vertical and horizontal beams for supporting cooling-coil stacks.

As schematically illustrated in FIG. 3, chamber 16 in tower assembly 10 has a plurality of cooling coils or coil stacks 26 vertically arranged with manifolds 48 for coupling to coolant-fluid supply conduits 22 and coolant-fluid return conduits 23. Cooling coil stacks 26 are secured to a tower frame structure, which is generally constructed of I-beams and cross-braces. The tower frame structure is depicted in FIG. 1 as a plurality of longitudinal broken lines 13 and transverse broken lines 15, which are representative of a grid network of vertical beams 13 and horizontal beams 15, which cooperate to form a three-dimensional grid or array for supporting screens 25 and coil stacks 26. FIG. 1A illustrates a representative array with rectangular coil stacks 27 in chamber 16 as a partial section of intersecting vertical beams 13 and horizontal beams 15, which exemplary array is merely an illustration and not a limitation. Screens 25 in FIG. 3 may be provided between each of the several layers of stacks 26 to restrict flotation of free ice crystals, as is known in the art.

Chamber 16 is generally cylindrical and is filled with a phase-change fluid, which is usually water, for freezing or chilling to store thermal cooling energy. Within the phase-change fluid bath, cooling coils or coil stacks 26 communicate a coolant fluid through the phase-change fluid bath to chill the phase-change fluid. FIG. 2 illustrates in plan view prior-art cooling coil stacks 27 within cylindrical cooling tower chamber 16. Prior-art coils or coil stacks 27 were generally elongated rectangular or oblong elements, which coil stacks 27 were provided in multiple units of various lengths to occupy the largest percentage of the cross-sectional area of cylindrically shaped chamber 16. Thereafter, a plurality of the prior-art coil stacks 27 were vertically assembled or stacked to provide the vertical arrangement of cooling coils.

In a typical prior-art cooling coil arrangement for cylindrical cooling towers, cooling coil stacks 27 only covered or occupied about sixty-one (61%) percent of the available tower cross-sectional area. Impliedly, less than all of the available cooling space was being occupied by cooling coils. Therefore, it required excess electrical and mechanical work to be performed by the external compressor-evaporator systems, as well as the available cooling coils, to cool the more remote, internal regions of cooling-tower chamber 16, which were not in close proximity to cooling coils 27. Frequently these remote internal regions cannot be completely frozen during periods of high use. This is considered an inefficient use of the available cooling capacity of the tower volume or an excess burden upon the refrigeration/cooling coil equipment. Consequently, occupying or covering the largest percentage of the cross-sectional and vertical area of chamber 16 with cooling coils 26 is considered to be a more desirable condition for utilization of the available cooling capacity, which requires filling both the cross-sectional and vertical volume of chamber 16. Occupying the vertical volume of chamber 16 has been accommodated by provision of adequate structural framing to support coil stacks 27, however the horizontal layout of stacks 27, and thus the cross-sectional area, has been an ongoing problem in the industry.

Coil stack arrangements 26 utilize at least seventy (70%) percent of the available cross-sectional area of a cylindrical tower, such as tower 10. More specifically in FIG. 4, coil stack 26 is shown in plan view with first continuous coil circuit or tube 32 extending from approximately longitudinal axis 18 toward housing 12. Coil circuit 32 has a plurality of u-shaped segments in a planar serpentine layout with open ends 40 and closed ends 42. Coil circuit 32 has first tube end 44 connected to return port 46 of first manifold 48, which return port side of manifold 48 is connected to coolant return conduit 23. Similarly, second tube end 50 of coil 32 is connected to supply port 52 and the fluid-supply side of second manifold 54, and thus to supply conduit 22. The manifold connections to coolant supply conduit 22 and return conduit 23 are noted in elevational view in FIG. 3 and in a cross-sectional view in FIG. 5. Manifold connections are more clearly shown in FIGS. 6 and 6A for representative coil 32.

In coil stack 26 of FIG. 4, a second continuous coil circuit 60 is noted in dashed outline, which coil circuit 60 also extends from about longitudinal axis 18 toward housing 12. Coil circuit 60 also has a planar serpentine layout, which is formed with a plurality of u-shaped segments having open ends 62 and closed ends 64. Coil circuit 60 has first tube end 66 connected to supply port 68 of first manifold 48 and second tube end 70 connected to return port 72 of second manifold 54. In the plan view of FIG. 4, it is apparent that the open ends 62 and closed ends 64 of coil circuit 60 substantially are, or would be, vertically aligned with the open and closed ends of coil circuit 32. However, coil circuit 60 is displaced from vertical alignment with coil circuit 32 to provide the coil lengths of coil circuit 60 in alignment with the openings of coil circuit 32 and similarly the coil lengths of coil circuit 32 are aligned with the openings of coil circuit 60. Thus, the overlayed or alternating array of coil circuits 32 and 60 in FIGS. 3, 5 and 6A provide effective staggered spacing of cooling coils to substantially fill the vertical height of coil stack 26 between the upper level of coil stack 26 at coil circuit 32 and the lower level of stack 26, which is noted for clarity as coil circuit 76.

Figure 5:
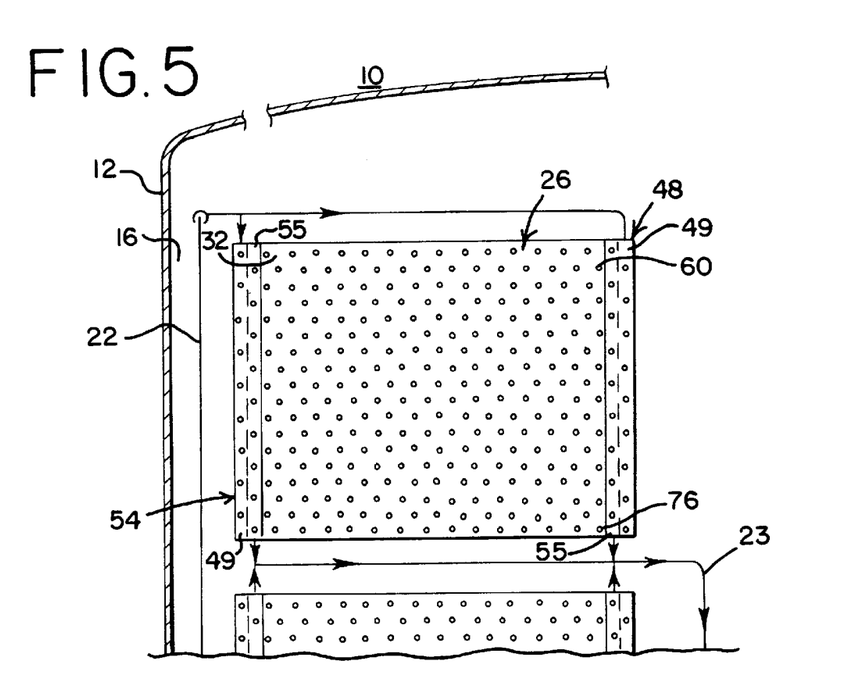
FIG. 5 is an elevational view of the coil stack in FIG. 4 taken along the line 5—5.
Figure 6:
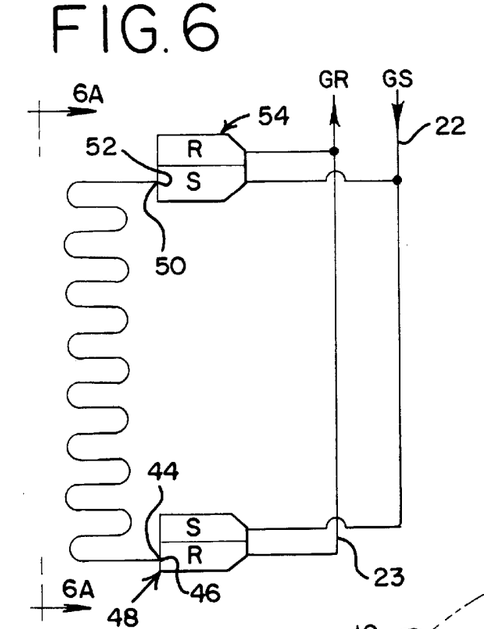
FIG. 6 is a plan view of a coil and manifold connection.
Figure 6A:
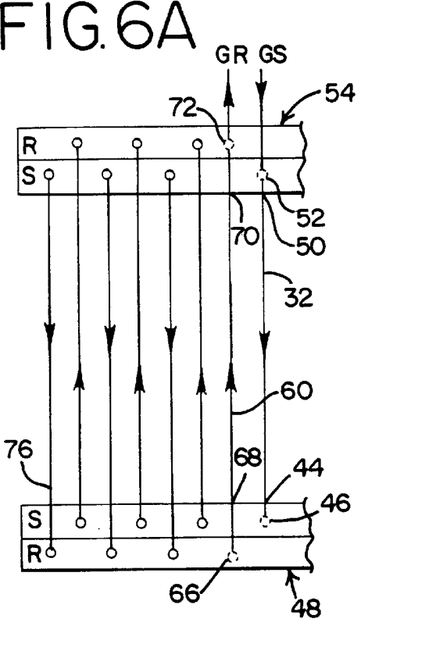
FIG. 6A is an elevational view of the coil and manifold connections of a coil arrangement in FIG. 6.

In a vertical plane intersecting coil stack 26, such as a radial plane projected through longitudinal axis 18 and extending through coil stack 26, the outline of coil circuits 32 and 60 appear as points similar to a crystal array in FIG. 5. The vertically alternating rows of coil circuits 32 and 60 repeat through the plane shown in FIG. 5 between upper coil circuit or level 32 and lower level or coil circuit 76. Coil circuit 76 would have a similar layout to coil circuit 60, which is noted as being an even circuit, with coil circuit 32 being denoted as odd. Manifolds 48 and 54 vertically extend, respectively, along the radially inner face of coil stack 26 in proximity to axis 18 and outer face of coil stack 26 in proximity to supply conduit 22. In FIGS. 3 and 5, the fluid flow from supply conduit 22 is noted as communicating to the supply sides 49 of manifolds 48 and 54 and similarly return conduit 23 is noted as coupled to the return sides 55 of manifolds 48 and 54. It is noted that the fluid flow from each of manifolds 48 and 54 through a coil circuit 32 or 60 is from the supply ports to the return port of the other manifold, and impliedly the fluid flow in coil circuits 32 and 60 would be in opposite directions. The specific locations of the connections to supply conduit 22 and return conduit 23 are shown in the figures as illustrations and not as limitations.

Figure 12:
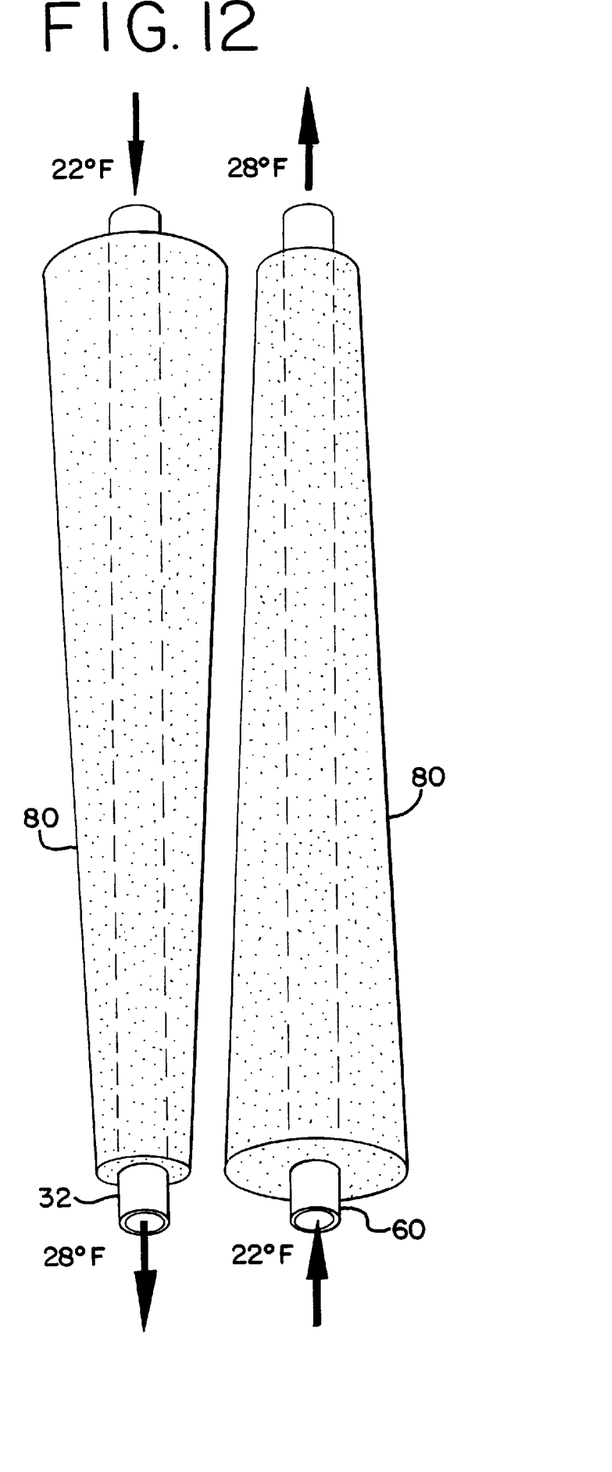
FIG. 12 illustrates an exemplary coolant flow-ice build up pattern in a typical coil section.

As a result of the opposite directional flow in the staggered coil circuits 32 and 60, the ice layer is more uniformly developed on coils 32 and 60 in chamber 16. In an ideal manner, the ice build up on coil circuits 32 and 60 would appear as noted in FIG. 12. The coolant fluid flow, as noted by the arrows, enters the individual coil circuits 32 or 60 at about 22° F. and exits the coil at about 28° F. with a tapered or conical growth of ice 80 surrounding coil circuits 32 and 60, which tapered ice growth has a wider diameter at the inlet and a narrower diameter at the outlet of each coil. The effect of this tapered ice growth around each individual coil provides an opportunity for generally smooth or uniform growth of ice mass within chamber 16 and, consequently, an efficient utilization of the coolant capacity or energy of the coolant fluid by maximizing the heat transfer between the coolant fluid and the phase-change fluid storage media.

Figure 7:
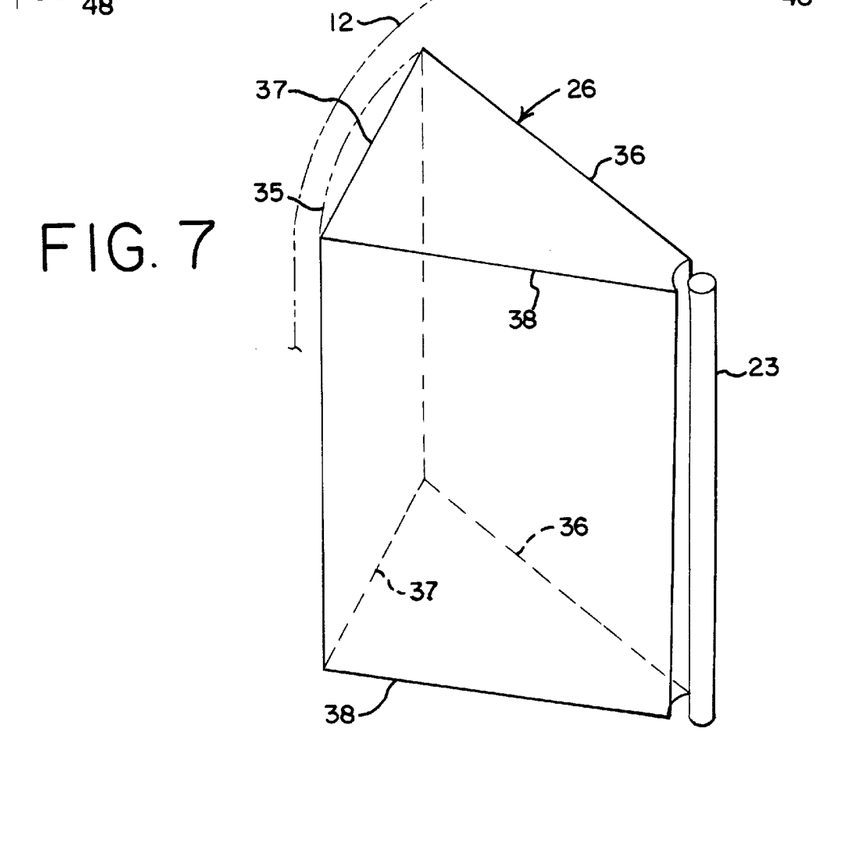
FIG. 7 is an oblique view of a coil stack assembly outline.
Figure 10:
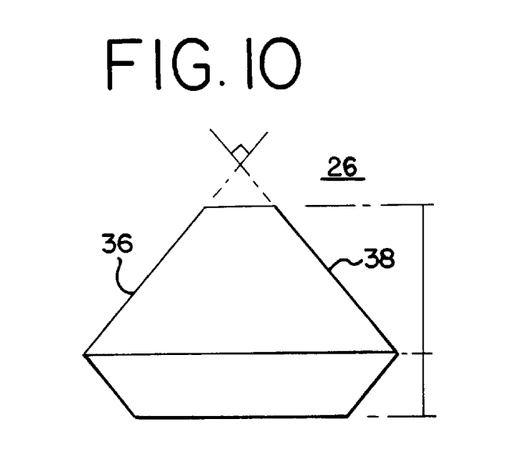
FIG. 10 is an outlined section of the 90° circuits in FIGS. 8 and 9.
Figure 11:
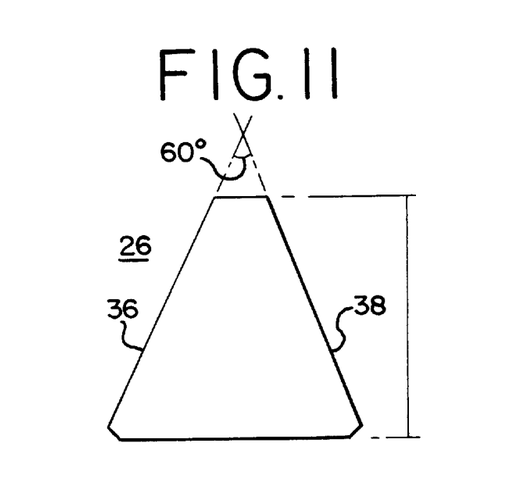
FIG. 11 is an outlined section of the 60° circuit in FIG. 4.

In FIGS. 7, 10 and 11 geometric configurations in oblique and plan views provide an illustration of some available coil stack arrangements 26. In FIG. 7, coil stack 26 is illustrated as a pie-shaped segment situated between housing 12 and coolant return conduit 23. The vertical height of coil stack 26 would be defined by the number of layers of individual coils in an array, coil circuits 32 and 60 for example. The specific radial arc segment may have an angular section of ninety degrees, 90°, as shown in FIG. 10, or sixty degrees, 60°, as shown in FIGS. 4 and 11. The specific planar angular displacement is a matter of design choice, and may reflect constraints of tower diameter or other mechanical factors, but the angularly shaped coil sections and coil stacks provide a larger areal coverage of the planar footprint of a cylindrical tower structure at foundation 20 than the present oblong or rectangular shaped coil sections. FIG. 4 illustrates outer edge 34 of coil circuit 32 emanating from manifold 54 and reflects it as about parallel to a chord 37 in FIG. 7. Alternatively, an arc section 35 for use as outer edge 34, as noted in FIG. 7, would more closely parallel the contour of housing 12, but as a practical matter, construction of such an arced coil section would be a difficult structural problem for manufacture of a coil section.

Figure 8:
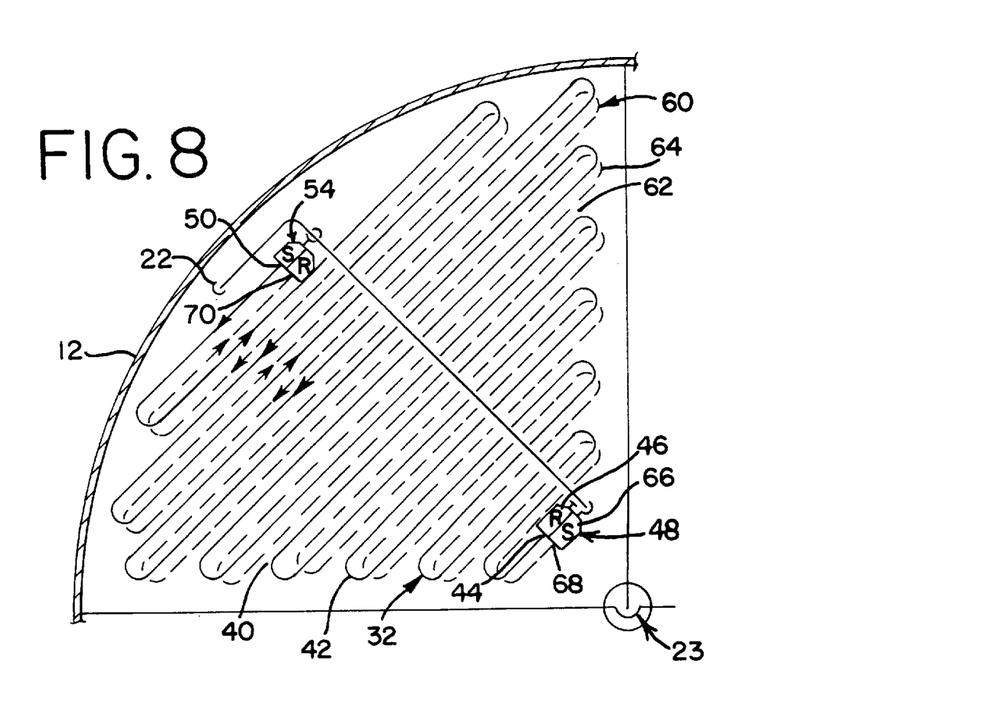
FIG. 8 is a plan view of a parallel circuit coil assembly in a 90° outline.
Figure 9:
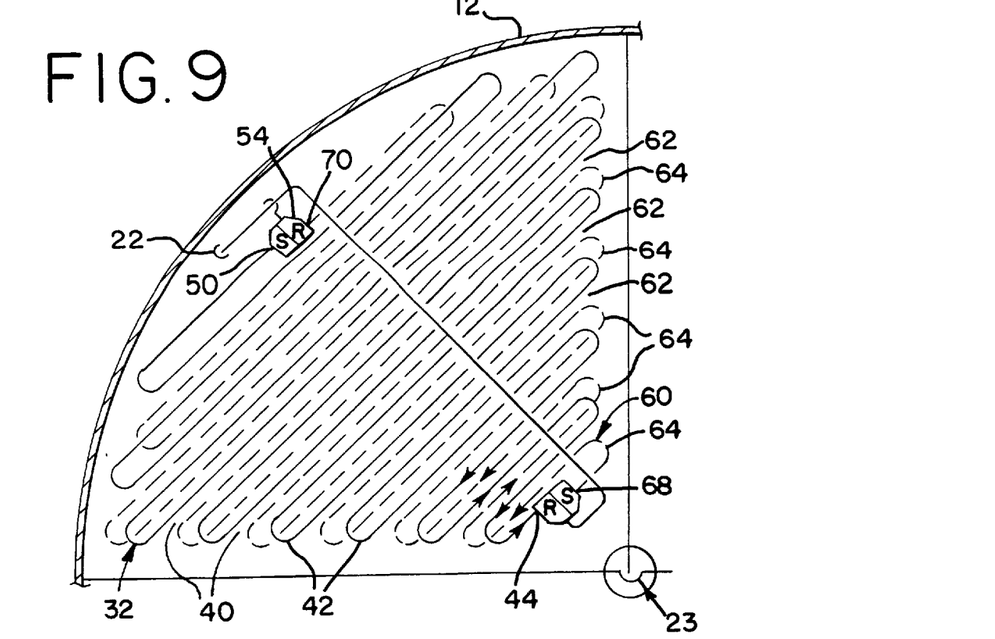
FIG. 9 is a plan view of a reverse circuit coil assembly in a 90° outline.

In FIGS. 8 and 9, plan views of coil layouts are noted for sections or coil stacks 26 with a 90° arc, which is utilized as an example and not a limitation. The coil layout in FIG. 8 is described as a parallel circuit coil in reference to return port 46 and supply port 66 of manifold 48 having coil ends 44 and 68, respectively, of coil circuits 32 and 60 emanating therefrom in the same physical direction. Similarly coil ends 50 and 70 emanate from manifold 54 in the same direction.

Alternatively, in the embodiment of FIG. 9, the circuit coil is noted as a reverse or opposite circuit, which is indicative of coil end 44 of coil circuit 32 at return port 66 of manifold 48 being in the same position as in the parallel circuit of FIG. 8. Thus, coil circuit 32 is in its same relative position as in FIG. 8 with open loop ends 40 and closed loop ends 42 similarly situated. However, coil circuit 60 in FIG. 9 is provided with closed loop ends 64 in a position opposite to their location in the parallel circuit of FIG. 8. Coil end 68 of coil circuit 60 in FIG. 9 is coupled to supply port 66 of manifold 48, however, the coil projects from manifold 48 in a direction away from the input of the loop of coil circuit 32 to return port 46. Thus the first loop of coil circuit 60 is displaced in a position opposite the location of a similar loop in FIG. 8, and the ordered arrangement of the loop closed and open ends is displaced by one u-shaped segment in the order of the tubing segments. The specific number of coil circuits 32 and 60 in a vertical stack 26 is determined by the design. Similarly, the arc distance of the segment and thus the shape of the coil segment in plan view is a matter of design choice.

In operation, coil circuits 32 and 60 and coil stacks 26 operate in a traditional manner from their refrigerant-coolant fluid carrying function. However, the ordered arrangement of coil circuits 32 and 60 in coil stacks 26, along with the vertical layout of coil circuits 32 and 60 in array 26, provides an increase in cooling capacity for the same size cooling tower. More particularly, representative coil stacks 27 in the prior art covered, or could overlay, only about sixty-one percent (61%) of the footprint area of a cooling tower 10, as illustrated in FIG. 2. As a consequence, it required more time and energy to freeze or chill the phase-change fluid media in chamber 16 of tower 10. However, by increasing the cross-sectional area, or footprint of tower 10, covered by cooling coil circuits 32 and 60, and consequently coil stacks 26, more of the phase-change fluid in chamber 36 is more quickly exposed to or in more intimate contact with cooling coil circuits 32, 60. This increased coil exposure provides more rapid freezing of the phase-change fluid, more efficient utilization of the freezing capacity of the cooling fluid in coils 32 and 60 as it has greater coil area exposed to the fluid media, and reduced energy use to provide the same cooling or freezing capacity. The present invention covers at least seventy percent (70%) of the cross-sectional area of the tower, which is an increase of about 15% of the utilization of the cross-sectional area over the above-noted prior art. Further, in the arrangement with the 90° arrays noted above, the coverage area may be as great as eighty percent (80%). It is clear that the increase in efficiency from the increased cooling coil coverage will provide an economic benefit at a nominal increase in capital outlay for increased coil costs.

In FIG. 3, an exemplary schematic refrigerant fluid flow connection network of conduits 22 and 23 are coupled to apparatus and equipment 75 to accommodate transfer of refrigerant fluid to each of coils 32 and 60 to accommodate the phase-change-fluid chilling and freezing function of coils 32 and 60. The specific piping, valving and refrigerant cycling for each coil 32 and 60 or for the cooling equipment is known in the art and not specifically noted in the figures. Each individual coil segment is provided with connecting manifolds as well as restriction valves and orifices. Not specifically noted but known in the chiller and ice thermal storage art are a supply fluid conduit coupled to a supply fluid riser pipe, which may vertically extend through a passage of tower 12, for communication of the phase-change fluid to distribution piping at chamber top 19. Distribution piping is a network of elongated piping longitudinally arranged over a column of coil stacks 26, which piping includes apertures or nozzles to evenly distribute the phase-change fluid across the cross-section of chamber 16 to coil stacks 26. It is expected that uniform fluid distribution will assist in more uniform heat transfer and solidification to avoid pockets of solidified material being retained for excessive periods or too rapid melting of ice in a single location.

In chamber 16, phase-change fluid in the liquid state is transferrable from bottom 21 of chamber 16 through an exhaust or discharge conduit 71 for pumping to external points of useful cooling. The spent or utilized phase-change fluid is subsequently returned to chamber 16 through a supply conduit 73. There are numerous methods of utilizing the cooling capacity of the phase-change fluid such as through heat exchangers or sub-coolers, and these uses are known in the art.

In a primary operational mode, vertical housing 12 serves as an ice generating and storage facility similar to a conventional ice thermal storage unit. However, the elevated structural arrangement of the plurality of vertically arranged and horizontally arrayed coil stacks 26 establishes unique fluid-transfer, thermal conductivity and structural parameter limitations. Illustrative of the fluid-transfer and structural limitations is the utilization of a stainless or galvanized steel mesh or wire screen 25 in FIG. 3 positioned between coil stacks 26 in vertical alignment. Mesh or screen 25 serves to effectively limit the size of any crystalline material which may break free from coil stack 26 and freely float in chamber 16. Limiting the movement of the crystalline material minimizes the probability of the crystalline material floating to chamber top 19, agglomerating with similar floating crystalline or ice material and inhibiting fluid flow and heat transfer within the array of coil stacks 26.

Tower assembly 10 provides a narrow, elongated structure, specifically housing 12, to retain a plurality of coil stacks 26 with at least twice the number of vertically arranged coil stacks 26 utilized in contemporary thermal storage units.

In operation, thermal storage facility 10 operates in a traditional manner, that is during the low-power-cost, low-coolant-demand period, typically during the night-time hours, thermal storage is provided by freezing the phase-change material in chamber 16, typically ice, on or around coil stacks 26. Each of coil stacks 26 is coupled to refrigerant fluid supply line 22 and refrigerant return line 23 with the appropriate flow-control valves. Thereafter, the usage of the stored thermal energy or coolant can be provided by circulation of either refrigerant fluid to be cooled through a heat exchange process during the high-power-cost, high-usage period, typically daytime hours, or the phase-change fluid in chamber 16 may be communicated to a load, such as a heat exchanger, and recycled through a supply line to top 19 of chamber 16. Upon cooling and freezing, phase-change material in chamber 16 will expand within chamber 16. Each of coil stacks 26 may experience an expansion during ice-buildup, and conversely a contraction during meltdown, of the phase-change material. In concert with expansion of coil stacks 26, structural members 13 and 15 may be expected to expand, or contract, which expansion and contraction must be accommodated by housing 12 and coupling members, not shown but known in the art, without distortion to the array of coil stacks 26 or disturbance to housing 12.

Further, the operation of tower 10 is not inhibited by an ice build up as screens 25 are provided between the stacks at the several levels in a known manner to inhibit ice floating and thereby a damming effect at the upper reaches of the tower. The height of tower 10 may be constrained by presently known physical limitations, such as an instability of the structure related to its height and the mass of the phase-change material. However, the specific height of the tower and the structural framework noted by beams 13 and 15 above are not a part of the present invention.

While the above invention has been described in connection with certain specific embodiments thereof, it is to be understood that this is by way of illustration and not by way of limitation; and the scope of the appended claim should be construed as broadly as the prior art will permit.

We claim:

1. A cooling coil arrangement for transfer of cooling fluid through a thermal-storage, phase-change fluid in a generally cylindrical cooling tower, said tower having a longitudinal axis, a generally circular cross-section transverse to said longitudinal axis, a housing with an outer surface and an inner surface, said housing defining a cooling-tower volume for maintaining said thermal storage phase-change fluid, said cooling tower having a plurality of cross-sectional planes intersecting said longitudinal axis and said housing, each said cooling tower cross-sectional plane having a plurality of radii extending from said longitudinal axis to intersect said housing, a first radius and a second radius cooperating to define an adjacent pair of said radii, each adjacent pair of radii in each said cross-sectional plane cooperate with said housing between said adjacent radii to define a planar sector with an area in each said transverse cross-section, each said planar sector tapering inward from said inner surface to said longitudinal axis, a chord extending between the intersection of said housing and each said adjacent radii in each said sector, said chord defining the longest length between said adjacent radii in each said sector, said cooling coil arrangement in each said sector comprising:

a plurality of tubing lengths, each said tubing length having a central passage for fluid transfer, a first end and a second end;

each said tubing length provided in one of said cross-sectional planes and having a plurality of continuously connected u-shaped segments cooperating to define a serpentine configuration from said tubing length, each said u-shaped segment having a closed end and an open end with said adjacent tube segment closed ends in proximity to adjacent tube segment open ends;

a plurality of manifolds, each said manifold having at least one inlet port and at least one discharge port, at least one of said manifolds positioned in proximity to said longitudinal axis, and at least another of said manifolds positioned in proximity to said housing inner surface, each of said manifolds generally parallel to said longitudinal axis, each said sector intersecting normally a manifold in proximity to said longitudinal axis and a manifold in proximity to said housing inner surface;

each said tubing length first end connected to one of said inlet and outlet ports of one of said manifolds in proximity to said axis and said inner surface, and the tubing length second end connected to the other of said inlet and outlet ports of the other of said manifolds in proximity to said axis and said inner surface, each said unshaped segment having a separation distance between said open end and said closed end, said separation distance increasing in length for each unshaped segment between said one manifold in proximity to said axis and said chord of said sector, each said open end and closed end in close proximity to one of said adjacent radii defining said sector with adjacent open ends and closed ends of adjacent u-shaped segments in proximity to the same radius, said serpentine configuration for said tubing length providing coverage of said sector area of at least seventy-percent of said area.

2. A cooling coil arrangement as claimed in claim 1 wherein each said unshaped segment has a decreasing separation between said chord and said housing inner surface.

3. A cooling coil arrangement as claimed in claim 1 further comprising a plurality of tubing lengths;

a plurality of said cross-sectional planes vertically aligned along said axis, each said vertical plane being parallel and having a first and second radii cooperating with said housing to define a planar sector parallel to said first sector;

each said one manifold and another manifold having a plurality of inlet and outlet coolant fluid ports;

a tubing length with a serpentine configuration positioned in each said sector, each said tubing length first end in each said sector connected to one of said one manifold and another manifold at one of said inlet and outlet ports arid said second end connected to the other of said one manifold and another manifold at the other of said inlet and outlet ports;

a plurality of said sectors, tubing lengths in said sectors, a manifold in proximity to said axis and another manifold in proximity to said housing cooperating to define a cooling stack.

4. A cooling coil arrangement as claimed in claim 3 wherein each said cross-sectional plane having a plurality of planar sectors;

a tubing length with a serpentine configuration positioned in each said sector;

one of said manifolds positioned in proximity to said axis for each said sector, and another of said manifolds positioned in proximity to said housing inner surface for each said sector, each said tubing length first end in each said sector connected to one of said inlet ports and outlet ports of said manifold in proximity to said axis, and said tubing length second end in each said sector connected to the other of said inlet port and outlet port of the manifold in proximity to said housing, said plurality of parallel tubing lengths coupled to said one manifold and another manifold for each said sector cooperating to define a cooling coil stack.

5. A cooling coil arrangement as claimed in claim 1 wherein each said open end of each said u-shaped segment is in proximity to one of said first and second radii defining said sector and the closed end of said u-shaped segment is in proximity to the other of said first and second radii, and said adjacent closed ends and open ends of said adjacent u-shaped segments are in proximity to the same one of said first and second radius.

6. A cooling coil arrangement as claimed in claim 1 wherein each said serpentine configuration in each said sector has a generally vee-shaped outline in said cross-sectional plane.

7. A coil arrangement as claimed in claim 1 wherein said first and second radii are displaced by sixty degrees in each said cross-sectional plane.

8. A coil arrangement as claimed in claim 1 wherein said first and second radii displaced by ninety degrees in each said cross-sectional plane.

9. A coil arrangement as claimed in claim 1 wherein said first and second radii displaced by forty-five degrees in each said cross-sectional plane.

10. A coil arrangement as claimed in claim 1 having each said adjacent radius in each said sector separated by an equal angular displacement to define a plurality of sectors in each said cross-sectional plane.

11. A coil arrangement as claimed in claim 4, wherein said housing has a top and a bottom, a plurality of coil stacks aligned along said axis in each said sector between said top and said bottom to provide a cooling coil arrangement for said housing.

12. A cooling coil arrangement as claimed in claim 1 wherein said cooling tower has a cooling apparatus for reducing the temperature of said cooling fluid, means for supplying cooling fluid at a first temperature from said cooling apparatus to said manifolds, and means for returning said cooling fluid from said cooling fluid to said cooling apparatus at a second and higher temperature, said cooling tower having means for discharging said phase-change fluid to an external device and means for returning said phase-change fluid to said tower volume from said external device;

said cooling coil arrangement further comprising means for connecting said manifold inlet ports to said means for supplying said cooling fluid and said manifold outlet ports to said means for returning said cooling fluid to said cooling apparatus;

each said tubing length communicating said cooling fluid from said cooling apparatus and manifold inlet port at said first temperature to said manifold outlet port and means for returning said cooling fluid, which cooling fluid is operable to reduce the temperature of said phase-change fluid for thermal storage of said reduced temperature material.

13. A cooling coil arrangement as claimed in claim 3, wherein each said unshaped segment in each said plane has a first leg, a second leg, a closed end, an open end and a gap between adjacent first and second legs, said tube segment closed ends in proximity to tube segment open ends of adjacent u-shaped segments in each said plane, each said u-shaped segment gap having a separation distance between said open end and said closed end, said separation distance increasing in length for each u-shaped segment between said vertex and said base of said triangular shape, said tubing lengths arranged in a plurality of generally parallel, vertically arrayed planes cooperating to define a stack of said tubing lengths wherein said vertically arrayed tubing lengths are provided with said vertically adjacent tubing-length legs aligned with said vertically adjacent gaps of said u-shaped segments.

* * * * *